United States Patent
Zhang et al.

(10) Patent No.: US 11,416,687 B2
(45) Date of Patent: Aug. 16, 2022

(54) METHOD AND APPARATUS FOR RECOGNIZING SPEECH

(71) Applicant: APOLLO INTELLIGENT CONNECTIVITY (BEIJING) TECHNOLOGY CO., LTD., Beijing (CN)

(72) Inventors: Yumei Zhang, Beijing (CN); Gui He, Beijing (CN); Jin Hu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 21 days.

(21) Appl. No.: 17/017,510

(22) Filed: Sep. 10, 2020

(65) Prior Publication Data
US 2021/0279418 A1 Sep. 9, 2021

(30) Foreign Application Priority Data
Mar. 4, 2020 (CN) .......................... 202010143037.5

(51) Int. Cl.
G06F 40/30 (2020.01)
G06F 40/205 (2020.01)
G10L 15/22 (2006.01)

(52) U.S. Cl.
CPC .......... *G06F 40/30* (2020.01); *G06F 40/205* (2020.01); *G10L 15/22* (2013.01)

(58) Field of Classification Search
CPC ......... G10L 15/04; G10L 15/05; G10L 15/22; G10L 25/87; G06F 40/205; G06F 40/30
See application file for complete search history.

(56) References Cited

U.S. PATENT DOCUMENTS

| | | | | |
|---|---|---|---|---|
| 6,138,100 A | * | 10/2000 | Dutton | G10L 15/1822 704/275 |
| 6,813,603 B1 | * | 11/2004 | Groner | G06F 40/174 704/235 |
| 6,865,528 B1 | * | 3/2005 | Huang | G10L 15/197 704/257 |

(Continued)

FOREIGN PATENT DOCUMENTS

| | | |
|---|---|---|
| CN | 107146602 A | 9/2017 |
| CN | 107195303 A | 9/2017 |

(Continued)

OTHER PUBLICATIONS

Google Translation of JP 3962904 B2, https://patents.google.com/patent/JP3962904B2/en?oq=JP+3962904+B2 (Year: 2007).*

(Continued)

*Primary Examiner* — Eric Yen
(74) *Attorney, Agent, or Firm* — Seed IP Law Group LLP (57) ABSTRACT

Embodiments of the present disclosure provide a method and apparatus for recognizing speech. An embodiment of the method includes: in response to detecting a speech frame, converting the speech frame into a current text in real time; in response to there being no previously saved historical text, inputting the current text into a semantic parsing model to obtain a parsing result; in response to the parsing result including a valid intention slot, ending a speech endpoint detection to complete the recognition; and outputting an instruction corresponding to the valid intention slot.

18 Claims, 5 Drawing Sheets

(56) References Cited

U.S. PATENT DOCUMENTS

| | | | |
|---|---|---|---|
| 9,437,186 B1 | 9/2016 | Liu et al. | |
| 2002/0135618 A1 | 9/2002 | Maes et al. | |
| 2011/0313768 A1* | 12/2011 | Klein | G06F 3/017 |
| | | | 704/251 |
| 2011/0320187 A1* | 12/2011 | Motik | G06F 40/30 |
| | | | 704/9 |
| 2016/0148610 A1* | 5/2016 | Kennewick, Jr. | G10L 15/18 |
| | | | 704/240 |
| 2017/0178627 A1* | 6/2017 | Firby | G10L 25/60 |
| 2017/0221475 A1* | 8/2017 | Bruguier | G10L 15/063 |
| 2017/0256261 A1* | 9/2017 | Froelich | G10L 15/02 |
| 2018/0143967 A1* | 5/2018 | Anbazhagan | G10L 15/183 |
| 2019/0139566 A1* | 5/2019 | Qian | G10L 15/22 |
| 2019/0295544 A1 | 9/2019 | Garcia et al. | |
| 2019/0318759 A1 | 10/2019 | Doshi et al. | |
| 2019/0378493 A1* | 12/2019 | Kim | G10L 15/22 |
| 2020/0020334 A1* | 1/2020 | Kang | G10L 15/22 |
| 2020/0135182 A1* | 4/2020 | Kahlon | G10L 15/22 |
| 2021/0082397 A1* | 3/2021 | Kennewick | G06F 3/167 |
| 2021/0104236 A1* | 4/2021 | Doggett | G10L 15/1822 |

FOREIGN PATENT DOCUMENTS

| | | |
|---|---|---|
| CN | 107665706 A | 2/2018 |
| CN | 107919130 A | 4/2018 |
| CN | 109599130 A | 4/2019 |
| CN | 109754809 A | 5/2019 |
| CN | 109979437 A | 7/2019 |
| CN | 110287303 A | 9/2019 |
| JP | 3962904 B2 * | 8/2007 |
| WO | 2018/153273 A1 | 8/2018 |

OTHER PUBLICATIONS

European Search Opinion for EP20195910, dated Feb. 25, 2021 (Year: 2021).*

European Search Report for EP20195910, dated Feb. 25, 2021 (Year: 2021).*

Translated JP Search Report for JP2020157479, dated Jan. 13, 2022 (Year: 2022).*

English Translation of First Office Action for CN 202010143037 (Year: 2022).*

Google translation of CN 107146602 A, 2017, https://patents.google.com/patent/CN107146602A/en?oq=CN+107146602A (Year: 2017).*

Chinese Office Action for Chinese Application No. 202010143037.5, dated Feb. 28, 2022, 12 pages.

Communication pursuant to Article 94(3) EPC for European Application No. 20 195 910.3, dated May 2, 2022, 5 pages.

* cited by examiner

METHOD AND APPARATUS FOR RECOGNIZING SPEECH

CROSS-REFERENCE TO RELATED APPLICATIONS

This application claims priority to Chinese Patent Application No. 202010143037.5, filed with the China National Intellectual Property Administration (CNIPA) on Mar. 4, 2020, the contents of which are incorporated herein by reference in their entirety.

TECHNICAL FIELD

Embodiments of the present disclosure relate to the field of computer technology, and more particularly to a method and apparatus for recognizing speech.

BACKGROUND

In an application scenario of speech recognition, not every intention is a coherent and non-stop sentence when expressed. Therefore, a general full-scene endpoint detection algorithm cannot meet the actual needs of the user, since for the same user, the speech speed and the pause time corresponding to different intentions are different.

In certain scenarios, such as stuck or a poor network state, the speech recognition engine fails the recognition or the recognition is incomplete, resulting in a large difference in recognition results and affecting user experience on the speech recognition.

The prior art generally detects whether the user has not continued to speak for a period of time at the speech flow level, and ends the endpoint. This manner of fixing the recognition time is too stiff and therefore lacks flexibility.

SUMMARY

Embodiments of the present disclosure provide a method and apparatus for recognizing speech.

In a first aspect, some embodiments of the present disclosure provide a method for recognizing speech, the method includes: in response to detecting a speech frame, converting the speech frame into a current text in real time; in response to there being no previously saved historical text, inputting the current text into a semantic parsing model to obtain a parsing result; in response to the parsing result including a valid intention slot, ending a speech endpoint detection to complete the recognition; and outputting an instruction corresponding to the valid intention slot.

In some embodiments, the method further includes: in response to the parsing result not including the valid intention slot, saving the current text as a historical text and continuing to detect a new speech frame, delaying a time of the speech endpoint detection.

In some embodiments, the method further includes: in response to there being a previously saved historical text, inputting the current text and the historical text into the semantic parsing model to obtain a new parsing result; in response to the new parsing result not including a valid intention slot, merging the current text into the historical text for saving, continuing to detect a new speech frame, and delaying the time of the speech endpoint detection; and in response to the new parsing result including a valid intention slot, ending the speech endpoint detection to complete the recognition, clearing the historical text, and outputting an instruction corresponding to the valid intention slot.

In some embodiments, the inputting the current text and the historical text into the semantic parsing model includes: splicing the current text and the historical text; and in response to the splicing being successful, inputting the spliced current text and the historical text into the semantic parsing model to obtain the new parsing result.

In some embodiments, the inputting the current text and the historical text into the semantic parsing model includes: in response to the splicing failing, resetting the historical text to be the current text, and inputting only the current text into the semantic parsing model.

In some embodiments, the method further includes: in response to the parsing result including a valid intention slot and being a fixed result, using the parsing result as a cache instruction, and storing a correspondence relationship table between the cache instruction and the current text; in response to acquiring a text to be parsed, matching the text to be parsed with the correspondence relationship table; and in response to the matching being successful, directly returning the cache instruction corresponding to the text to be parsed without using the semantic parsing model.

In a second aspect, some embodiments of the present disclosure provide an apparatus for recognizing speech, the apparatus includes: a conversion unit, configured to convert a speech frame into a current text in real time in response to detecting the speech frame; a parsing unit, configured to input the current text into a semantic parsing model to obtain a parsing result, in response to there being no previously saved historical text; a judging unit, configured to end a speech endpoint detection to complete the recognition, in response to the parsing result including a valid intention slot; and an output unit, configured to output an instruction corresponding to the valid intention slot.

In some embodiments, the apparatus further includes: a splicing unit, configured to in response to the parsing result not including the valid intention slot, save the current text as a historical text and continue to detect a new speech frame, delay a time of a speech endpoint detection.

In some embodiments, the splicing unit is further configured to: in response to there being a previously saved historical text, input the current text and the historical text into the semantic parsing model to obtain a new parsing result; in response to the new parsing result not including a valid intention slot, merge the current text into the historical text for saving, continue to detect a new speech frame, and delay the time of the speech endpoint detection; and in response to the new parsing result including a valid intention slot, ending the speech endpoint detection to complete the recognition, clearing the historical text, and outputting an instruction corresponding to the valid intention slot.

In some embodiments, the splicing unit is further configured to: splice the current text and the historical text; and in response to the splicing being successful, input the spliced current text and the historical text into the semantic parsing model to obtain the new parsing result.

In some embodiments, the splicing unit is further configured to: in response to the splicing failing, resetting the historical text to be the current text, and inputting only the current text into the semantic parsing model.

In some embodiments, the apparatus further includes a cache unit configured to: in response to the parsing result including a valid intention slot and being a fixed result, use the parsing result as a cache instruction, and store a correspondence relationship table between the cache instruction and the current text; in response to acquiring a text to be parsed, match the text to be parsed with the correspondence relationship table; and in response to the matching being successful, directly return the cache instruction corresponding to the text to be parsed without using the semantic parsing model.

In a third aspect, some embodiments of the present disclosure provide an electronic device for recognizing speech, the electronic device includes: one or more processors; storage means on which one or more programs are stored, where when the one or more programs are executed by the one or more processors, causing the one or more processors to implement any one of the method described in the first aspect.

In a fourth aspect, some embodiments of the present disclosure provide a computer-readable medium having a computer program stored thereon, where the computer program, when executed by a processor, implements any one of the method described in the first aspect.

The method and apparatus for recognizing speech, by establishing a semantic parsing model, the intention is parsed at the same time as the speech recognition. For a valid intent, the recognition and analysis process will be completed in advance, which greatly improves the speed of speech recognition analysis. For an invalid intention, the time for a speech endpoint detection is automatically extended and the recognition continues until a valid intent is recognized, which improves the accuracy of recognition.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
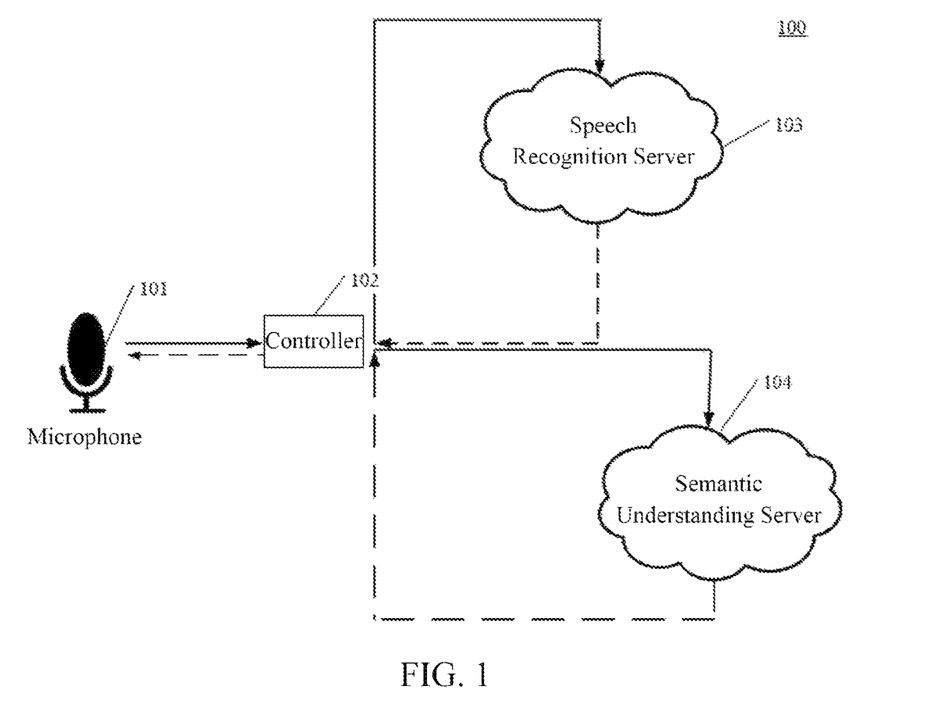
FIG. 1 is an example system architecture diagram in which an embodiment of the present disclosure may be applied.

FIG. 1 illustrates an example system architecture 100 in which a method for recognizing speech or an apparatus for recognizing speech may be applied.

As shown in FIG. 1, the system architecture 100 may include a microphone 101, a controller 102, a speech recognition server 103, and a semantic understanding server 104. The network is a medium for providing a communication link between the controller 102, the speech recognition server 103, and the semantic understanding server 104. The network may include various types of connections, such as wired, wireless communication links, or fiber optic cables, and the like.

The user may input voice to the controller 102 by using the microphone 101. The controller 102 then interacts with the speech recognition server 103 and the semantic understanding server 104 through the network, to receive or send messages, etc. The microphone 101 may be a voice input device mounted on a mobile device such as an unmanned vehicle, or may be a built-in device of a mobile phone or a computer etc. The controller may be an in-vehicle device or a built-in device of a mobile phone or a computer etc. The controller 102 has the function of receiving and transmitting information.

The controller 102 also has the functions of offline speech recognition and semantic understanding. For example, the controller 102 may recognize a wake-up word or the like may be identified offline. If the voice recognition cannot be performed offline, the voice needs to be sent to the voice recognition server to perform voice recognition, to obtain text. And the text is sent to the semantic understanding server to obtain an instruction.

The speech recognition server 103, is for receiving the speech transmitted by the controller 102 and converts the vocabulary content in the speech into a computer-readable input, such as a key, a binary code or a character sequence. Unlike speaker recognition and speaker confirmation, the latter attempts to recognize or confirm the speaker who makes the speech, rather than the lexical content contained therein. Speech recognition system is installed on the speech recognition server 102. Speech recognition systems are generally includes two phases: training and decoding. Training, i.e. training an acoustic model through a large number of labeled speech data. Decoding, i.e., recognizing speech data rather than the training set into text by the acoustic model and a language model. The quality of the trained acoustic model directly affects the accuracy of the recognition.

The semantic understanding server 103 is configured to receive a text result sent by the controller 102 and perform semantic analysis on the basis of the text result. Semantic analysis refers to learning and understanding the semantic content represented by a piece of text by using various methods, and any understanding on language can be classified as a category of semantic analysis. A piece of text is usually composed of words, sentences, and paragraphs, and semantic analysis can be further decomposed into lexical-level semantic analysis, sentence-level semantic analysis, and textual-level semantic analysis, depending on the linguistic units of the comprehension object. In general, lexical-level semantic analysis focuses on how to acquire or distinguish the semantics of words, while sentence-level semantic analysis attempts to analyze the semantics expressed by the entire sentence, while textual-level semantic analysis aims to study the internal structure of natural language text and to understand the semantic relationship between text units (which may be sentence clauses or paragraphs). Briefly, the goal of semantic analysis is to achieve automatic semantic analysis at various linguistic units, including words, sentences, texts, etc., by establishing an effective model and system, to achieve an understanding of the true semantics of the entire text expression.

Note that the speech recognition server 103 and the semantic understanding server 104 may be hardware or software. When the server is hardware, the server may be implemented as a distributed server cluster composed of multiple servers may be implemented, or as a single server. When the server is software, the server may be implemented as a plurality of software or software modules (e.g., a plurality of software or software modules for providing distributed services), or as a single software or software module. It is not specifically limited herein.

It should be noted that the method for recognizing speech provided in embodiments of the present disclosure is generally performed by the controller 102, and accordingly, the apparatus for recognizing speech are generally provided in the controller 102.

It should be understood that the numbers of microphones, controllers, speech recognition servers, semantic understanding servers in FIG. 1 are merely illustrative. There may be any number of microphones, controllers, speech recognition servers, and semantic understanding servers as required for implementation.

Figure 2:
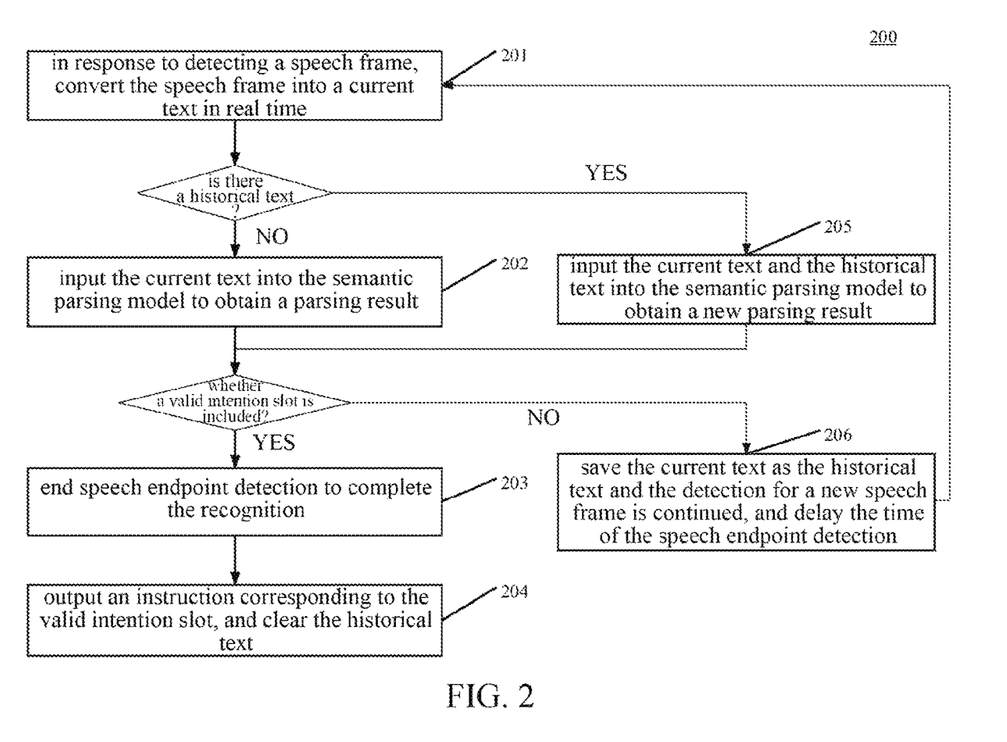
FIG. 2 is a flowchart of a method for recognizing speech according to an embodiment of the present disclosure.

Further with reference to FIG. 2, a flow 200 of a method for recognizing speech according to an embodiment of the present disclosure is shown. The method for recognizing speech comprises the steps of:

Step 201, in response to detecting a speech frame, convert the speech frame into a current text in real time.

In the present embodiment, the execution body of the method for recognizing speech (for example, the controller shown in FIG. 1) may acquire consecutive speech frames from the microphone in real time through a wired connection mode or a wireless connection mode. The average energy of a speech frame is calculated once the speech frame is acquired. The method for calculating the average energy may adopt a method in the prior art, and details are not described herein. In response to detecting a first speech frame having an average energy greater than a preset start threshold, the first speech frame and the speech frames following the first speech frame are converted into a current text in real time by an ASR (Automatic Speech Recognition) technique.

In step 202, in response to there being no previously saved historical text, input the current text into a semantic parsing model to obtain a parsing result.

In the present embodiment, if the previous parsing on the speech recognition result fails, the speech recognition result is saved as a historical text. If the previous parsing is successful, there will be no historical text. If there is no historical text, the current text currently identified is directly inputted into the semantic parsing model. The semantic parsing model is used to determine and parse user intentions. For example, the semantic parsing model parses the speech such as "I wanna listen to xxx", "navigate to xxx", and then obtains corresponding intentions. The model covers common scenarios, including vehicle control commands, navigation commands, music commands, telephone commands, and the like. The semantic parsing model is realized by slot filling technology. The slot filling technique refers to a process of completing information, in order to convert an intention of a user into a specific instruction of the user. In current slot recognition methods, there are mainly two methods: Knowledge-based slot recognition and model-based slot recognition:

(1) Knowledge-based slot recognition method. This scheme uses a manually constructed knowledge base to identify a slot through certain rule matching.

(2) Model-based slot recognition method. This scheme converts the slot filling problem into a sequence labeling problem, and uses a statistical machine learning model for slot recognition.

In step 203, in response to the parsing result including a valid intention slot, end speech endpoint detection to complete the recognition.

In the present embodiment, common scenes have corresponding sentence patterns, such as "I wanna listen to xxx", "navigate to xxx". If these scene feature words in the semantic parsing model are matched, the recognition on the endpoint detection can be optimized, and the endpoint detection can be ended in advance. Other scenarios such as encyclopedia do not match.

Herein a voice activity detection (VAD) technique is related, which is a technique for detecting, in a noise environment, a segment of speech from a user starts to speak until the user finishes speaking, that is, detecting a start point and an end point of the speech uttered by the user. In each speech recognition flow, before the speech recognition engine starts processing, speech data needs to be segmented by the voice activity detection technique. The average energy of a speech frame is calculated once the speech frame is acquired, and then the average energy of the speech frame is compared with a preset start threshold. If the average energy of the speech frame is greater than the preset start threshold, the speech frame is considered to be the start frame of the speech to be recognized.

According to the solution of the present disclosure, speech frames including the start frame and following frames are recognized in real time to obtain an intermediate recognition result of the speech recognition. It is not necessary to detect energy to judge whether the user has finished speaking, but once a complete semantic is obtained, it considers that the user has finished speaking an instruction, and the recognition result can be returned without waiting a silence period. However, the prior art needs to wait until the endpoint is detected before a segment of speech from the start point to the endpoint is recognized together.

In step 204, output an instruction corresponding to the valid intention slot, and clear the historical text.

In this embodiment, the spoken language input by the user may be converted into machine-executable instructions and then output to the corresponding execution module for execution. For example, the user utters "I wanna listen to 'me and my country'", and then it is converted into an instruction "play the song 'me and my country'" and then the instruction is outputted to a multimedia module for execution. If the parsing is based on historical text, the historical text needs to be cleared after the parsing is successful.

In step 205, in response to there being previously saved historical text, input the current text and the historical text into the semantic parsing model to obtain a new parsing result.

In the present embodiment, if there is previously stored historical text, it means that the intention of the user has not been successfully parsed out during the previous parsing. The user may haven't finished the speaking last time, and there is a pause. The currently received voice is a supplement to the last received voice. Therefore, it is necessary to input the current text and the historical text into the semantic parsing model together to obtain a new parsing result. Splicing is performed on the current text and the historical text. If the splicing is successful, the spliced current text and historical text are input into the semantic parsing model to obtain a new parsing result. If the splicing fails, the historical text is reset to be the current text, and only the current text is inputted into the semantic parsing model.

For example, if the historical text is "I wanna go to" and the current text is "Chaoyang Dayue City", the two texts may be spliced into "I wanna go to Chaoyang Dayue City" for inputting into a semantic parsing model, to obtain the intention of the user is to navigate to Chaoyang Dayue City. If the historical text is "I wanna go" and the current text is "I wanna listen to", then the historical text "I wanna go" is abandoned, and the historical text is reset to be "I wanna listen to".

If it can parse out from the current text a valid intention slot, the parsing result is directly obtained and the historical text is cleared.

In step 206, if the parsing result does not include a valid intention slot, save the current text as the historical text and the detection for a new speech frame is continued, and delay the time of the speech endpoint detection.

In the present embodiment, if what the user has uttered is not complete, then a valid intention slot cannot be parsed out, the current text that has been recognized can be saved as a historical text. The detection on new speech frames is continued, the detection for speech endpoint is automatically delayed. Instead, the endpoint is determined based on power and timeout.

Figure 3:
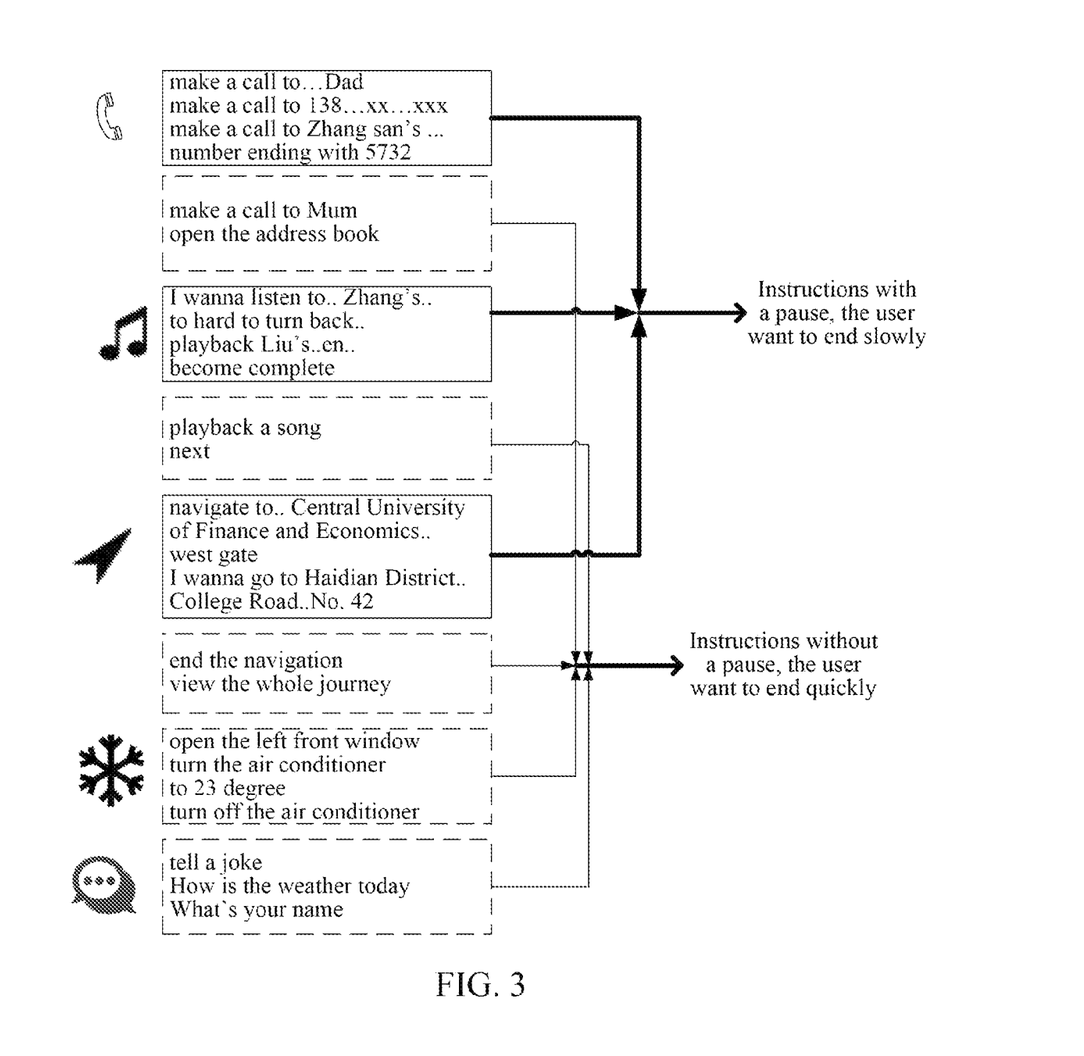
FIG. 3 is a schematic diagram of an application scenario of a method for recognizing speech according to an embodiment of the present disclosure.

With further reference to FIG. 3, FIG. 3 is a schematic diagram of an application scenario of a method for recognizing speech according to the present embodiment. In the application scenario of FIG. 3, in the course of controlling the speech interaction of making a call, once the user has uttered the word "make", the average energy of this speech frame is calculated, and it is detected that the average energy of this speech frame is greater than the preset start threshold and is used as the first speech frame. Speech recognition is continuously performed on the first speech frame and the speech frames following the first speech frame to obtain the current text, and the current text is inputted into the semantic parsing model to obtain the parsing result. If the user pauses after uttering particular words "make a call to", no valid intention slot is passed out at this time. Then, the current text "make a call to" is saved as a historical text, and waiting for the user to continue to enter voice. After "Dad" is recognized according to the new speech frame, the historical text "make a call to" and the current text "Dad" are spliced and then inputted into the semantic parsing model, to obtain a parsing result. The parsing result has a valid intention slot, and thus the voice recognition is ended and an instruction "dial the phone number of Dad" is outputted to the dialling module.

Figure 4:
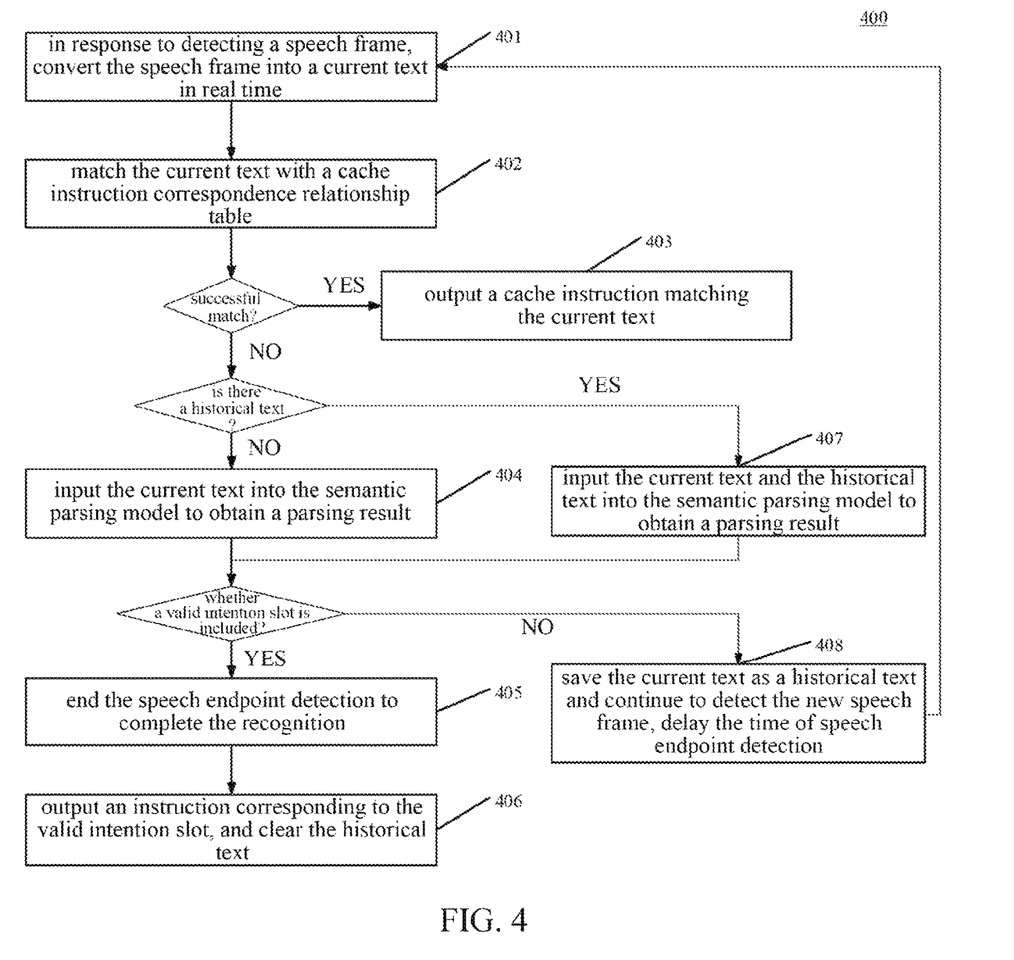
FIG. 4 is a flowchart of a method for recognizing speech according to another embodiment of the present disclosure.

Referring further to FIG. 4, a flow 400 of a method for recognizing speech according to another embodiment is illustrated. The flow 400 of the method for recognizing speech includes the steps of:

Step 401, in response to detecting a speech frame, converts the speech frame into a current text in real time.

Since step 401 is substantially the same as step 201, details are not described.

Step 402: match the current text with a correspondence relationship table corresponding to cache instructions.

In the present embodiment, some correspondence relationships between cache instructions and texts may be stored in advance, and a cache instruction is cached only if the obtained semantic parsing result is fixed, and dynamic results such as "navigate to xxx" cannot be cached. The cache instruction may cache generalized instructions such as "open that door". In addition to pre-stored cache instructions, instructions that have been recognized and parsed may be stored as cache instructions at any time during use.

In step 403, if the matching is successful, output a cache instruction matching the current text.

In the present embodiment, after the received speech is converted into text, the text is directly matched with the correspondence relationship table corresponding to cache instructions. If a cache instruction corresponding to the text is found, it is not necessary to input the text into the semantic parsing model for parsing the text, then the endpoint detection is ended in advance, and the instruction is returned in advance.

In step 404, if the match is unsuccessful and there is no previously saved historical text, input the current text into the semantic parsing model to obtain a parsing result.

In step 405, if the parsing result includes a valid intended slot, end the speech endpoint detection to complete the recognition.

In step 406, output an instruction corresponding to the valid intention slot, and clear the historical text.

Step 407: If there is a previously saved historical text, input the current text and the historical text into the semantic parsing model to obtain a new parsing result.

In step 408, if the parsing result does not include a valid intention slot, save the current text as a historical text and continue to detect the new speech frame, delay the time of speech endpoint detection.

Step 404-Step 408 is substantially the same as step 202-206, and therefore details are not described.

As can be seen from FIG. 4, compared with the corresponding embodiment of FIG. 2, the flow 400 of the method for recognizing speech in the present embodiment embodies a result optimization process in which the "non-dynamic result", that is, the semantic parsing result is fixed, for example, "open the window on the driver's side", so that the endpoint detection can be ended ahead of time, and the reaction speed can be improved.

Figure 5:
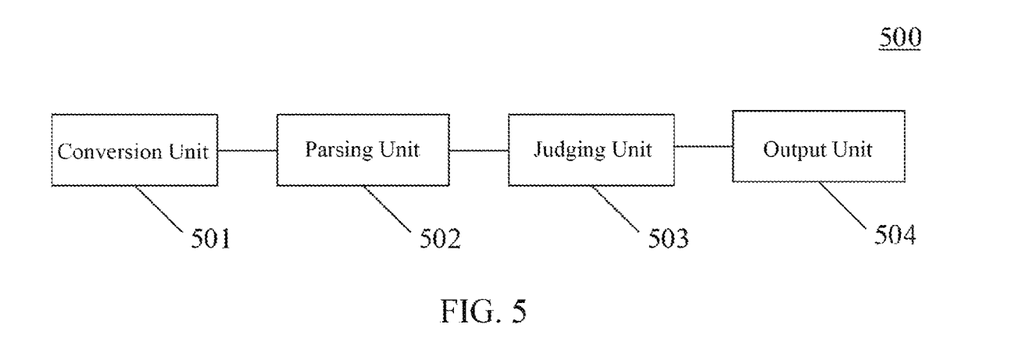
FIG. 5 is a schematic structural diagram of an apparatus for recognizing speech according to the an embodiment of present disclosure.

With further reference to FIG. 5, as an implementation of the method shown in each of the above figures, an embodiment of the present disclosure provides an apparatus for recognizing speech, which corresponds to the method embodiment shown in FIG. 2, and which is particularly applicable to various electronic devices.

As shown in FIG. 5, the apparatus 500 for recognizing speech in the present embodiment includes a conversion unit 501, a parsing unit 502, a judging unit 503, and an output unit 504. The conversion unit 501 is configured to convert a speech frame into a current text in real time in response to detecting the speech frame. The parsing unit 502 is configured to input the current text into a semantic parsing model to obtain a parsing result, in response to there being no previously saved historical text. The judging unit 503 configured to end a speech endpoint to complete the recognition, in response to the parsing result including a valid intention slot. The output unit 504 is configured to output an instruction corresponding to the valid intention slot.

In the present embodiment, specific processing of the conversion unit 501, the parsing unit 502, the judging unit 503, and the output unit 504 of the apparatus 500 for recognizing speech may refer to step 201, step 202, step 203, and step 204 in the corresponding embodiment of FIG. 2.

In some alternative implementations of the present embodiment, the apparatus 500 further includes a splicing unit (not shown in the drawings) configured to, in response to the parsing result not including the valid intention slot, save the current text as a historical text and continue to detect a new speech frame, delay a time of a speech endpoint detection.

In some alternative implementations of the present embodiment, the splicing unit is further configured to: in response to there being a previously saved historical text, input the current text and the historical text into the semantic parsing model to obtain a new parsing result; in response to the new parsing result not including a valid intention slot, merge the current text into the historical text for saving, continue to detect a new speech frame, and delay the time of the speech endpoint detection; and in response to the new parsing result including a valid intention slot, ending the speech endpoint detection to complete the recognition, clearing the historical text, and outputting an instruction corresponding to the valid intention slot.

In some alternative implementations of the present embodiment, the splicing unit is further configured to: splice the current text and the historical text; and in response to the splicing being successful, input the spliced current text and the historical text into the semantic parsing model to obtain the new parsing result.

In some alternative implementations of the present embodiment, the splicing unit is further configured to: in response to the splicing failing, resetting the historical text to be the current text, and inputting only the current text into the semantic parsing model.

In some alternative implementations of the present embodiment, the apparatus 500 further includes a cache unit (not shown in the drawings) configured to: in response to the parsing result including a valid intention slot and being a fixed result, use the parsing result as a cache instruction, and store a correspondence relationship table between the cache instruction and the current text; in response to acquiring a text to be parsed, match the text to be parsed with the correspondence relationship table; and in response to the matching being successful, directly return the cache instruction corresponding to the text to be parsed without using the semantic parsing model.

Figure 6:
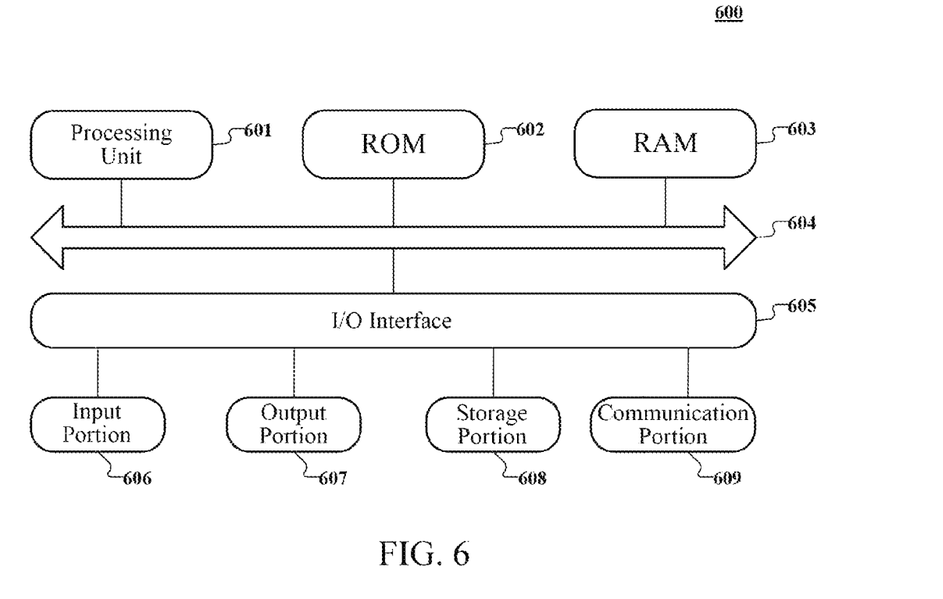
FIG. 6 is a schematic structural diagram of a computer system suitable for implementing an electronic device of an embodiment of the present disclosure.

Referring now to FIG. 6, there is shown a schematic structural diagram of an electronic device (e.g., a controller in FIG. 1) 600 suitable for implementing embodiments of the present disclosure. The controller shown in FIG. 6 is merely an example and should not be construed as limiting the functionality and usage scope of embodiments of the present disclosure.

As shown in FIG. 6, the electroic device 600 includes a processing unit 601, such as a central processing unit or a graphic processing unit, which may execute various appropriate actions and processes in accordance with a program stored in a read-only memory (ROM) 602 or a program loaded into a random access memory (RAM) 603 from a storage portion 608. The RAM 603 also stores various programs and data required by operations of the electroic device 600. The processing unit 601, the ROM 602 and the RAM 603 are connected to each other through a bus 604. An input/output (I/O) interface 605 is also connected to the bus 604.

Generally, the following components are connected to the I/O interface 605: an input portion 606 including a touch screen, a touch pad, a keyboard, a mouse, a camera, a microphone, an accelerometer, a gyroscope, etc.; an output portion 607 including a Liquid crystal display (LCD), a speaker, a vibrator, etc.; a storage portion 608 including a tape, a hard disk and the like; and a communication portion 609. The communication device 609 can allow the electronic device 600 to perform wireless or wired communication with other devices to exchange data. Although FIG. 6 shows an electronic device 600 having various portions, it should be understood that it is not required to implement or have all the illustrated portions. It may alternatively be implemented or provided with more or fewer portions. Each block shown in FIG. 6 can represent a portion or can represent multiple portions as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the storage portion 608, or may be installed from the ROM 602. The computer program, when executed by the processing unit 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by the electronic device, cause electronic device to: in response to detecting a speech frame, convert the speech frame into a current text in real time; in response to there being no previously saved historical text, input the current text into a semantic parsing model to obtain a parsing result; in response to the parsing result including a valid intention slot, end a speech endpoint to complete the recognition; and output an instruction corresponding to the valid intention slot.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising a conversion unit, a parsing unit, a judging unit and a an output unit, where the names of these units or modules do not in some cases constitute a limitation to such units or modules themselves. For example, the conversion unit may also be described as "a unit for converting a speech frame into a current text in real time, in response to detecting the speech frame."

The above description only provides an explanation of preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing speech, the method comprising:
   in response to detecting a speech frame of the speech, converting the speech frame into a current text in real time;
   in response to there being no previously saved historical text, inputting the current text into a semantic parsing model to obtain a parsing result;
   in response to the parsing result including a valid intention slot, ending a speech endpoint detection to complete recognizing the speech; and
   outputting an instruction corresponding to the valid intention slot.

2. The method according to claim 1, wherein the method further comprises:
   in response to the parsing result not including the valid intention slot, saving the current text as a historical text and continuing to detect a new speech frame of the speech, and delaying a time of the speech endpoint detection.

3. The method according to claim 1, wherein the method further comprises:
   in response to there being a previously saved historical text, inputting the current text and the historical text into the semantic parsing model to obtain a new parsing result;
   in response to the new parsing result not including the valid intention slot, merging the current text into the historical text for saving, continuing to detect a new speech frame of the speech, and delaying a time of the speech endpoint detection; and
   in response to the new parsing result including the valid intention slot, ending the speech endpoint detection to complete recognizing the speech, and clearing the historical text.

4. The method according to claim 3, wherein the inputting the current text and the historical text into the semantic parsing model comprises:
   splicing the current text and the historical text; and
   in response to the splicing being successful, inputting a new text obtained by splicing the current text and the historical text into the semantic parsing model to obtain the new parsing result.

5. The method according to claim 4, wherein the inputting the current text and the historical text into the semantic parsing model comprises:
   in response to the splicing failing, resetting the historical text to be the current text, and inputting only the current text into the semantic parsing model.

6. The method according to claim 1, wherein the method further comprises:
   in response to the parsing result including the valid intention slot and being a fixed result, using the parsing result as a cache instruction, and storing a corresponding relationship;
   in response to acquiring a text to be parsed, matching the text to be parsed with the current text in the correspondence relationship table; and
   in response to the matching being successful, directly returning the cache instruction corresponding to the current text without using the semantic parsing model.

7. An apparatus for recognizing speech, comprising:
at least one processor; and
a memory storing instructions, the instructions when executed by the at least one processor, cause the at least one processor to perform operations, the operations comprising:
converting a speech frame of the speech into a current text in real time in response to detecting the speech frame;
inputting the current text into a semantic parsing model to obtain a parsing result, in response to there being no previously saved historical text;
ending a speech endpoint detection to complete recognizing the speech, in response to the parsing result including a valid intention slot; and
outputting an instruction corresponding to the valid intention slot.

8. The apparatus according to claim 7, wherein the operations further comprise:
in response to the parsing result not including the valid intention slot, saving the current text as a historical text and continuing to detect a new speech frame of the speech, and delaying a time of the speech endpoint detection.

9. The apparatus according to claim 7, wherein the operations further comprise:
in response to there being a previously saved historical text, inputting the current text and the historical text into the semantic parsing model to obtain a new parsing result;
in response to the new parsing result not including the valid intention slot, merging the current text into the historical text for saving, continuing to detect a new speech frame of the speech, and delaying a time of the speech endpoint detection; and
in response to the new parsing result including the valid intention slot, ending the speech endpoint detection to complete recognizing the speech, and clearing the historical text.

10. The apparatus according to claim 9, wherein the inputting the current text and the historical text into the semantic parsing model comprises:
splicing the current text and the historical text; and
in response to the splicing being successful, inputting a new text obtained by splicing the current text and the historical text into the semantic parsing model to obtain the new parsing result.

11. The apparatus according to claim 10, wherein the inputting the current text and the historical text into the semantic parsing model comprises:
in response to the splicing failing, resetting the historical text to be the current text, and inputting only the current text into the semantic parsing model.

12. The apparatus according to claim 7, wherein the operations further comprise:
in response to the parsing result including the valid intention slot and being a fixed result, using the parsing result as a cache instruction, and storing a corresponding relationship between the cache instruction and the current text into a correspondence relationship table;
in response to acquiring a text to be parsed, matching the text to be parsed with the current text in the correspondence relationship table; and
in response to the matching being successful, directly returning the cache instruction corresponding to the current text without using the semantic parsing model.

13. A non-transitory computer readable medium having a computer program stored thereon, wherein the computer program, when executed by a processor, causes the processor to perform operations, the operations comprising:
in response to detecting a speech frame of a speech, converting the speech frame into a current text in real time;
in response to there being no previously saved historical text, inputting the current text into a semantic parsing model to obtain a parsing result;
in response to the parsing result including a valid intention slot, ending a speech endpoint detection to complete recognizing the speech; and
outputting an instruction corresponding to the valid intention slot.

14. The medium according to claim 13, wherein the operations further comprise:
in response to the parsing result not including the valid intention slot, saving the current text as a historical text and continuing to detect a new speech frame of the speech, and delaying a time of the speech endpoint detection.

15. The medium according to claim 13, wherein the operations further comprise:
in response to there being a previously saved historical text, inputting the current text and the historical text into the semantic parsing model to obtain a new parsing result;
in response to the new parsing result not including the valid intention slot, merging the current text into the historical text for saving, continuing to detect a new speech frame of the speech, and delaying a time of the speech endpoint detection; and
in response to the new parsing result including the valid intention slot, ending the speech endpoint detection to complete recognizing the speech, and clearing the historical text.

16. The medium according to claim 15, wherein the inputting the current text and the historical text into the semantic parsing model comprises:
splicing the current text and the historical text; and
in response to the splicing being successful, inputting a new text obtained by splicing the current text and the historical text into the semantic parsing model to obtain the new parsing result.

17. The medium according to claim 16, wherein the inputting the current text and the historical text into the semantic parsing model comprises:
in response to the splicing failing, resetting the historical text to be the current text, and inputting only the current text into the semantic parsing model.

18. The medium according to claim 13, wherein the operations further comprise:
in response to the parsing result including the valid intention slot and being a fixed result, using the parsing result as a cache instruction, and storing a corresponding relationship between the cache instruction and the current text into a correspondence relationship table;
in response to acquiring a text to be parsed, matching the text to be parsed with the current text in the correspondence relationship table; and
in response to the matching being successful, directly returning the cache instruction corresponding to the current text without using the semantic parsing model.

* * * * *